US012219426B2

(12) United States Patent
Dadhaniya et al.

(10) Patent No.: US 12,219,426 B2
(45) Date of Patent: *Feb. 4, 2025

(54) SYNCED AUDIO SIGNALS BETWEEN A DEVICE AND ATM

(71) Applicant: Capital One Services, LLC, McLean, VA (US)

(72) Inventors: Janak Dadhaniya, San Francisco, CA (US); Steve Faletti, Brooklyn, NY (US); David Wurmfeld, Falls Church, VA (US); Robert Smith, Richmond, VA (US); Lisa Whitsitt, Millbrae, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 464 days.

This patent is subject to a terminal disclaimer.

(21) Appl. No.: 17/157,225

(22) Filed: Jan. 25, 2021

(65) Prior Publication Data

US 2021/0144514 A1 May 13, 2021

Related U.S. Application Data

(63) Continuation of application No. 16/242,379, filed on Jan. 8, 2019, now Pat. No. 10,939,237.

(51) Int. Cl.
*G06Q 20/10* (2012.01)
*G06V 40/16* (2022.01)
(Continued)

(52) U.S. Cl.
CPC ........ *H04W 4/024* (2018.02); *G06Q 20/1085* (2013.01); *G06V 40/161* (2022.01); *H04L 63/0861* (2013.01); *H04W 4/06* (2013.01)

(58) Field of Classification Search
CPC ...... H04W 4/024; H04W 4/06; G06V 40/161; G06Q 20/1085; H04L 63/0861
(Continued)

(56) References Cited

U.S. PATENT DOCUMENTS 7,494,053 B1 * 2/2009 Burns ................ G07F 19/203
235/379
7,925,022 B2 4/2011 Jung et al.
(Continued)

FOREIGN PATENT DOCUMENTS

EP 3355257 A1 * 8/2018 ............. G06K 19/07

OTHER PUBLICATIONS

Wang, SoundAuth: Secure Zero-Effort Two-Factor Authentication Based on Audio Signals. 2018 IEEE Conference on Communications and Network Security (CNS). 2018, 9 pages. ISBN: 978-1-5386-4586-4. (Year: 2018).*

(Continued)

*Primary Examiner* — Ambreen A. Alladin
(74) *Attorney, Agent, or Firm* — HUNTON ANDREWS KURTH LLP

(57) ABSTRACT

A user can submit a request to a server associated with an ATM. The request can be submitted from a device (or portable device) of the user. The server can evaluate the request and designate which ATM or ATMs are best suited to process the request. This determination can be based on availability of resources on the ATM. Subsequently, the server can transmit a communication to the device of the user and the designated ATM. The communication can cause both the device and the ATM to emit a sound or display a visual cue to guide the user to approach the designated ATM. The device and the ATM can emit various patterns of sound to better guide the user to approach the designated ATM.

9 Claims, 3 Drawing Sheets

(51) Int. Cl.
*H04L 9/40* (2022.01)
*H04W 4/024* (2018.01)
*H04W 4/06* (2009.01)

(58) Field of Classification Search
USPC .......................................................... 705/43
See application file for complete search history.

(56) References Cited

U.S. PATENT DOCUMENTS

| | | | |
|---|---|---|---|
| 8,496,168 | B1 | 7/2013 | Miller et al. |
| 9,815,407 | B1 | 11/2017 | Anderson |
| 10,332,358 | B1* | 6/2019 | Burks ................ G07F 19/203 |
| 2012/0143755 | A1 | 6/2012 | Burrell |
| 2012/0171959 | A1 | 7/2012 | Cheng |
| 2013/0135095 | A1 | 5/2013 | Stochita |
| 2014/0070959 | A1 | 3/2014 | Bhargava et al. |
| 2014/0081858 | A1 | 3/2014 | Block et al. |
| 2014/0235171 | A1 | 8/2014 | Molettiere et al. |
| 2015/0211858 | A1 | 7/2015 | Jerauld |
| 2016/0012411 | A1* | 1/2016 | Kursun ................ G07F 19/205 705/42 |
| 2016/0098709 | A1 | 4/2016 | Johnson et al. |
| 2016/0180322 | A1 | 6/2016 | Song et al. |
| 2016/0191513 | A1 | 6/2016 | Tomlinson et al. |
| 2016/0275760 | A1 | 9/2016 | Block et al. |
| 2017/0210201 | A1 | 7/2017 | Green et al. |
| 2018/0343142 | A1 | 11/2018 | Scalisi |

OTHER PUBLICATIONS

Raja et al. Interactive ATM for Visually Challenged. 2020 International Conference on System, Computation, Automation and Networking (ICSCAN). Jul. 2020. 9 pages. ISBN: 978-1-7281-6202-7. (Year: 2020).*

Alan, F., "Use your smartphone to withdraw money from a Bank of America ATM," (2012), downloaded from https://www.phonearena.com/news/Use-your-smartphone-to-withdraw-money-from-a-Bank-of-America-ATM_id82424.

Florence Ion, "Hands-on_NFC-enabled ATMs make it easy to withdraw cash with a smartphone," (2016), Greenbot, downloaded from https://www.greenbot.com/article/3088951/android/hands-on-nfc-enabled-atms-make-it-easy-to-withdraw-cash-with-a-smartphone.html.

Matt Hamblen, "Going cardless at the ATM catches on," (2016), Computerworld, downloaded from https://www.computerworld.com/article/3098926/mobile-wireless/going-cardless-at-the-atm-catches-on.html.

https://www.sleepphones.com/sites/default/files/AS-SP-Wireless-QuickStartGuide.pdf.

European Extended Search Report issued in related European Application No. EP 19 21 5022 PCT/US2020/041763, mailed May 27, 2020.

European Examination Report issued in related European Application No. EP 19 215 022.5 mailed Dec. 13, 2021, 7 pages.

Canadian Examination Report issued in related Canadian Application No. 3,064,264 mailed Nov. 9, 2023, 4 pages.

* cited by examiner

SYNCED AUDIO SIGNALS BETWEEN A DEVICE AND ATM

CROSS REFERENCE TO RELATED APPLICATION:

This application is a continuation of U.S. patent application No. 16/242,379 filed Jan. 8, 2019, the complete disclosure of which is incorporated herein by reference in its entirety.

BACKGROUND

An automated teller machine ("ATM") is an electronic telecommunications device which enables certain transactions at any time and without the need for direct interaction with bank staff. ATMs are ubiquitous these days. ATMs can be found at drive-through locations or even indoor locations.

SUMMARY

An example ATM transaction can include inserting an ATM card in an ATM by an accountholder, providing an identification code to the machine to verify the identity of the account holder, selecting a transaction from a menu displayed on the ATM and retrieving notes or providing a check to the machine. The first three steps of this example transaction are usually the most time-consuming part of the transaction. Up until now, these steps had to be completed at the ATM, and hence, streamlining and expediting ATM transactions was not feasible.

Additionally, these days many ATM users prefer customizing their transactions. For example, many users prefer specifying the denomination of the bank notes they retrieve from an ATM machine, e.g., $20 and $50 bills. As a result, many ATM machines carry different types of notes. However, ATMs have limited capacity to hold banknotes. In busy locations where there are multiple ATMs in a row, unpredictable and erratic demand by customers can finish up certain notes in some of the machines faster than others. This may result in users having to check multiple ATMs before they can find an ATM which can complete their request.

One solution to this problem (and other problems associated with ATMs) is to transmit a request for a transaction ahead of time and process the request prior to the user's arrival at the machine. For example, a server can receive the user's request and the server can determine which machine is most suitable for processing the user's request. The server can also transmit a message to the user and the machine chosen by the user. Using the message, the user can identify and visit the machine designated by the server to conduct the transaction. As a result, ATM transactions can be expedited.

In this context, it is preferable to ensure that the authorized user knows which machine to approach and that only the authorized user conducts the transaction at the machine. This disclosure provides for a system and method which provides sound and/or visual signals to the user to guide the user to approach the correct ATM.

In one example embodiment, a user can submit a request to a server associated with an ATM. The request can be submitted from a device (or portable device) of the user. The server can evaluate the request and designate which ATM or ATMs are best suited to process the request. This determination can be based on availability of resources on the ATM. Subsequently, the server can transmit a communication to the device of the user and the designated ATM. The communication can cause both the device and the ATM to emit a sound or display a visual cue to guide the user to approach the designated ATM. The device and the ATM can emit various patterns of sound to better guide the user to approach the designated ATM.

In one embodiment, the server can poll the ATMs eligible to address the user's request prior to making the determination or designation. For example, the server can ask the ATMs if they have the many resources to process the request. Based on the responses, the server can make the determination or designation.

The system and method described in this disclosure can include several key benefits. For example, the system facilitates allocation of ATMs based on availability of resources. This can expedite ATM transactions and simplify resource planning for the ATMs. As another example, this system can help individuals with disability to better utilize these machines. In particular, because both the user's device and the ATM can emit guiding signals, disabled individuals can be guided to the appropriate machine.

DETAILED DESCRIPTION

In an example embodiment, an ATM can include a housing. Various components of the ATM can be located it the housing. The housing can include an access door for feeding various supplies and money into the ATM. The housing can also include an interface area. The housing can protect various components of the ATM against damage and vandalism. The housing can also enhance the aesthetics of the ATMs.

Figure 1:
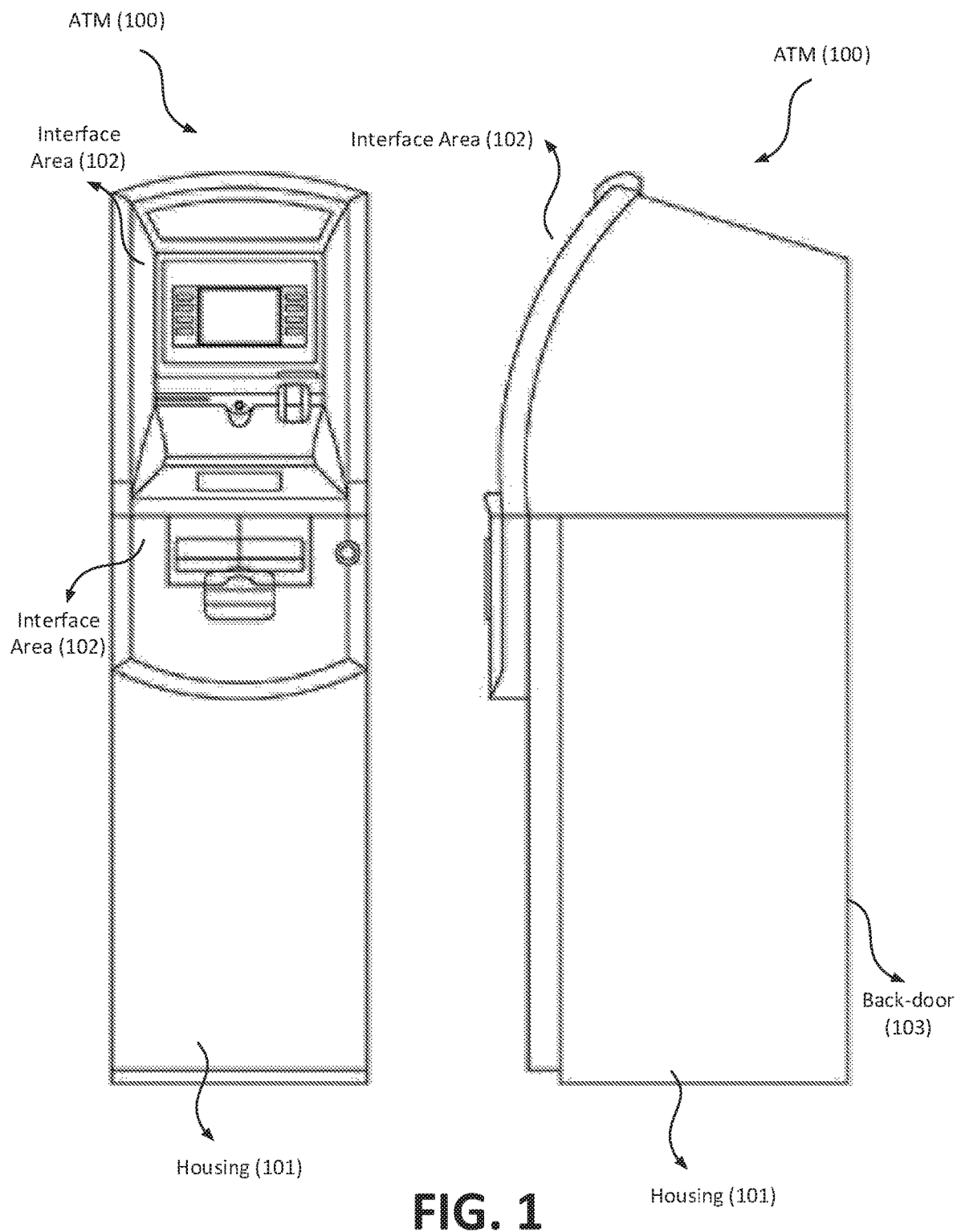
FIG. 1 shows front and side views of an ATM according to an example embodiment.

FIG. 1 shows front and side views of an ATM 100 according to an example embodiment. In this example embodiment, the ATM 100 includes a housing 101 and an interface area 102. The ATM can also include a back-door 103, which facilitates access to the inner components of the ATM as well as a vault. An ATM can provide a user with banknotes. A banknote (bill, paper money, paper currency or note, hereafter referred to collectively as a "note" or "notes") can be a medium of exchange for goods or services.

The Components of the ATM

In an example embodiment, the ATM can include a vault. Certain parts or components of the ATM can require restricted access, and the vault can store these parts or components. For example, the vault can protect a processing unit. The vault can also be used as a storage for money. In some embodiments, the money can be placed in cassettes and the vault can include a space for storing the cassettes.

In an example embodiment, an ATM can include a processing unit. The processing unit can include a processor, a memory (and/or hard drive), a transmitter and a receiver. The processor can execute and run an operating system software stored on the memory (and/or hard driver) of the processing unit. Using the transceivers (i.e., transmitters and receivers), the processor can connect to a network, such as the Internet, and transmit and receive signals form a server. For example, the ATM can respond to polling requests received from the server, and in response to receiving messages from the server, the processor can cause a speaker or display of the ATM to emit sounds or display visual cues.

The processor can also send and receive various signals to other components of the ATM, e.g., a display, a speaker, a cash dispenser, a card reader or a sensor. Using these signals, the processor can control the operation of these components. The processor can also cause the operating system software to show a user interface on a display of the ATM or emit various sounds via the speaker. In some embodiments, the processor, using the transceivers, can communicate with a smart device, which can be a mobile device, a cellphone, a smartphone, a laptop, a desktop, a notebook, a tablet, a wearable device, etc.

In some embodiments, the ATM can include a secure cryptoprocessor. The secure cryptoprocessor is a dedicated computer on a chip or microprocessor for carrying out cryptographic operations, embedded in a packaging with multiple physical security measures, which give it a degree of tamper resistance. The secure cryptoprocessor can be located in a secure enclosure or the vault.

In an example embodiment, the ATM can include a card reader. There can be several types of card readers, e.g., contact and contactless. A card reader can read information from and write information onto a smart card. In some embodiments, the card reader can pass information from the smart card to processing unit and write information from the processing unit into the smart card. The card reader can provide power to the smart card and link the card's hardware interface to the processing unit. Since the smart card's processor can control the actual flow of information into and out of the card's memories, the card reader can operate with only minimal processing capabilities for sending the information to the processing unit.

In some embodiments, the card reader can include a processor and a transceiver. The contact type smart cards generally include an interface, which can consist of an 8-contact connector (e.g., contact pad 102). The interface can look like a small gold circle or series of squares on the surface of the card. Other arrangements are also possible. The card reader can include several connector pins. In order for a card reader to communicate with the contact-type card, the pins of the card reader's connector must physically touch the contacts on the smart card's connector during data transfer. The processor of the card reader can decode any data received from the smart card. The card reader can also update, delete or modify the information stored on the smart card.

A card reader can write data on the smart card by passing the data to the processor of the smart card. The processor can process the data and store it in the smart card's memory. A card reader can have a two-way communication with a smart card as described in ISO 14443. The smart card can include an RFID tag. The two-way communication can be digitally encoded. There can be several frequency ranges, and several proprietary formats for the two-way communication (e.g., HID in the 125 Mhz range). The 13.56 Mhz frequency range (NFC) is dominated by ISO 14443 compatible cards.

A card reader and a smart card can exchange messages, which can include commands or data. For example, a card reader can send a command message to the smart card, the smart card can process the command message in its processor and the smart card can send back a response message to the card reader. Each of the command message and the response message can include data. A message can include TLV (Type, Length and Value) data and a command such as STORE_DATA command which prompts storage of the data included in the message in the smart card.

In an example embodiment, the ATM can include a keypad or other input devices. the keypad can include one or more keys for receiving commands from a user. For example, using the keypad, the user can select one or more options displayed on a display of the ATM. The ATM can include other input devices. For example, the ATM can include a touch pad screen, which can receive input or commands from the user. In some embodiment, the ATM can include one or more function key buttons. These function key buttons can be placed on the interface area of the ATM machine, e.g., next to the display.

In an example embodiment, the ATM can include a display. The display can be any display known in the art. For example, the display can be an LCD, CRT, OLED, AMOLED, e-Ink, electronic paper, etc. The display can show a user interface of the operating system. The user interface can show various options for operating the ATM. For example, the user interface can display various options for retrieving cash from the machine. In some embodiments, the display can be a touch screen display. For example, the user can navigate through the options of the user interface by touching the screen of the display.

In an example embodiment, the ATM can include a printer. The printer can print paper record for each transaction conducted at the ATM. For example, the printer can be a thermal printer, which can produce a printed image by selectively heating coated thermochromic paper when the paper passes over the thermal print head. Other printers are also known in the art and one of ordinary skill in the art recognizes that these printers can be used in the ATM.

In an example embodiment, the ATM can include various indicators. For example, the indicators can be LED lights which can inform the user about the status of the device, e.g., the device is out of order. In one embodiment, an indicator can indicate whether the user is close enough to the ATM so that the user can easily access the ATM. The user can see the indicator and move, e.g., the user's car, closer to the ATM.

In an example embodiment, the ATM can include at least one sensor. The sensor can be a camera or a motion detector.

Figure 2:
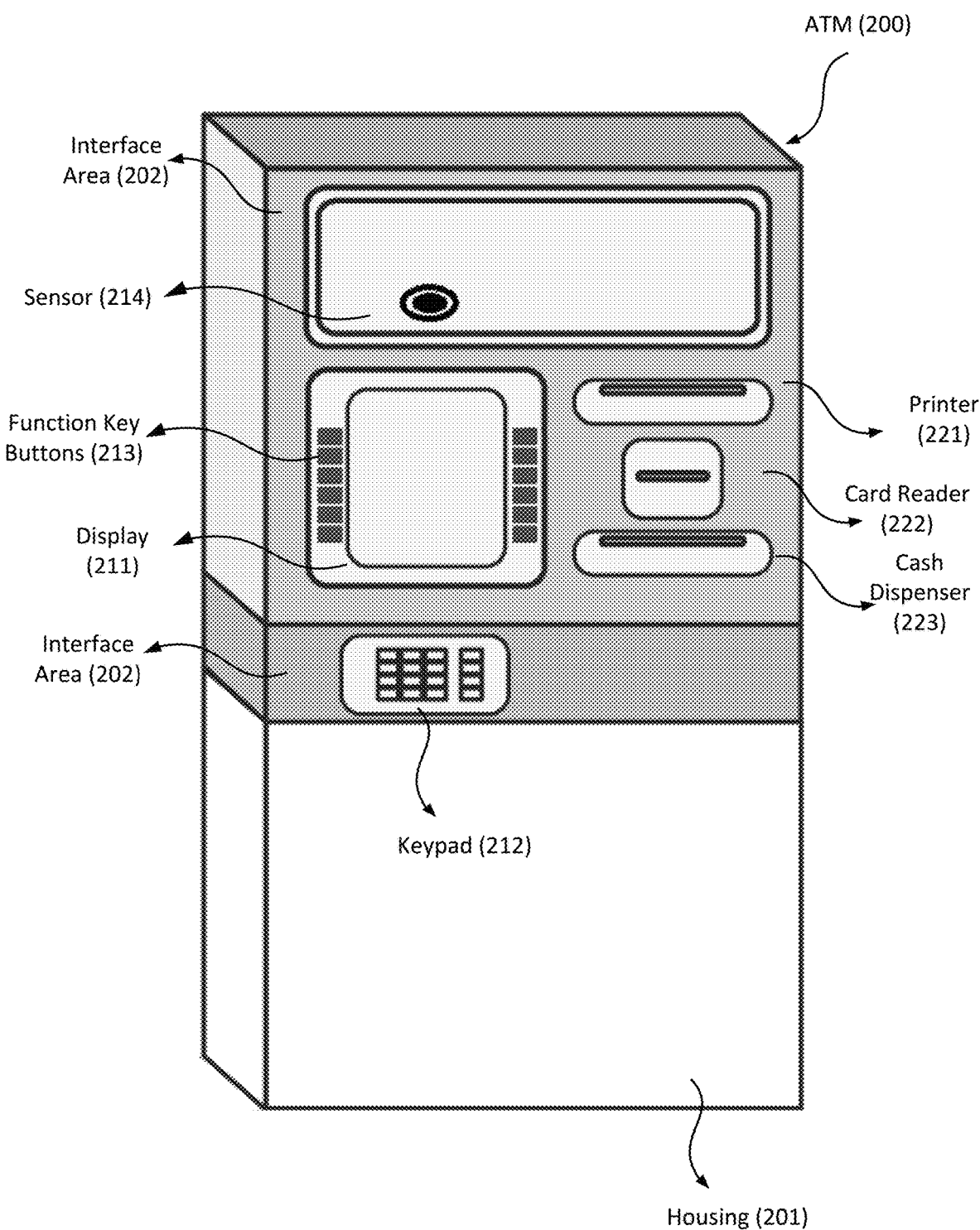
FIG. 2 shows an interface area of another ATM according to an example embodiment.

FIG. 2 shows the interface area 202 of an ATM 200 according to an example embodiment. The ATM 200 has a housing 201 and the interface area 202 is located on the top front of the housing 201. On the interface area 202, there is a display 211, a keypad 212, a set of function key buttons 213, a sensor 214. The interface area 202 also has a few orifices for providing prints from a printer 221, receiving and reading a smart card using a card reader 222 and dispensing cash using a cash dispenser 223. The printer 221, card reader 222 and cash dispenser 223 are placed behind the interface areas 202.

ATM Cluster

In an example embodiment, a facility can include an ATM cluster (sometimes referred to as ATM row or ATM bank). The ATM cluster can include one or more ATMs located next to each other or close to each other. In some embodiments, the ATMs in an ATM cluster can be located within the same room. In other embodiments, the ATMs in an ATM cluster do not have to be located within the same room or even the same building.

In an example embodiment, the ATMs included in an ATM cluster can be similar. In other embodiments, the ATMs can include different capabilities, have different components or include different notes. For example, only one of the ATMs in an ATM cluster can include a device for receiving checks. As another example, only one of the ATMs can be enabled to accommodate a disabled person. As yet another example, some of the ATMs can be provided with notes of a different denomination, e.g., one ATM can include only $20 notes while another ATM can include only $100 notes.

In an example embodiment, a server can be used to optimize the use of the ATMs included in the row. For example, a server can receive a request from a plurality of users. The server can determine which ATM is best suited to serve each one of the users. The server can also prioritize the requests it receives from the users. The server can assign users to ATMs based a variety of factors.

Multi-Interface ATMs

In an example embodiment, an ATM can be a multi-interface ATM. For example, the multi-interface ATM can include a core set of components shared by all the interfaces, e.g., one vault, one cash storage unit and one cash dispensing mechanism. However, the multi-interface ATM can include a plurality of interface areas, and each interface area can be suitable to serve a customer. In one embodiment, each interface area can include a display and a keypad.

A multi-interface ATM can serve multiple customers at the same time because the ATM includes multiple interfaces. Each customer can place a request at an interface of the multi-interface ATM. A processing unit associated with the interface or the processing unit of the multi-interface ATM can process the request and order the relevant components of the ATM to conclude the transaction. For example, after receiving a request for a sum of money at an interface of the multi-interface ATM, the processing unit can order the cash dispensing mechanism to convey the notes to the interface area used by the customer.

In one embodiment, each interface of a multi-interface ATM can include the same features and capabilities. However, in another embodiment, some of the interfaces of the multi-interface ATM can have different features or capabilities. For example, one interface of a multi-interface ATM can include equipment which can facilitate interaction with a disabled person.

The Request

In an example embodiment, a user can submit a transaction request ("request") to a service provider. For example, the request can be submitted to a server of a bank to withdraw cash from an ATM machine owned by the bank. There can be various methods for submitting the request to the server. In one example, the request can be submitted through an application of a smart device of the user. The application can be a personal banking application. The application can include various pages. On one of the application's pages, the user can specify a transaction and other information relating to the transaction. For example, the user can specify an amount of money that the user intends to withdraw from the user's bank account. The user can also specify a location or the denomination of the notes the user desires to retrieve.

In an example embodiment, the user can specify the request on a website. For example, the user can log into the user's bank account. The website can include a button or link for receiving the user's request. For example, the user can place a request for depositing a check. In some embodiments, the user can also specify other information. For example, the user can specify the location of the ATM in which the check is going to be deposited.

In an example embodiment, the user can specify a location for conducting the transaction. For example, the user can specify that the user desires to withdraw money from the user's local branch. In another example embodiment, the user can specify a set of locations or a geographical area for conducting the transaction. For example, the user can specify that the user intends to pick up a sum of money in the Financial District of Manhattan, New York. In yet another example embodiment, the user can specify an ATM cluster as the location for conducting the transaction.

In one embodiment, when creating a request, the user can identify a device that the user is going to carry with the user to the pick-up location. For example, the user can specify that the user is going to have a smart device, cellphone, button, or any other device with the user at the pick-up location. The device can include a module for transmitting a signal to the server when the device is at a location related to the ATM, e.g., the bank premises. The device can also include a module for causing a speaker of the device to emit sounds in response to receiving a signal from the server.

In an example embodiment, the user can specify a default request. For example, the user can specify that every time the user enters the bank's premises, the user intends to withdraw $60. In defining a default request, the user can specify a cash amount, a pick-up location, a pick-up time, a pick-up device to be carried with the user, etc. In this embodiment, each time the user enters the bank, the user's device transmits a message to the server of the bank. Once the message is received, the bank processes the user's default request. The default request can depend on a location. For example, the user can specify a first default request for a first branch and a second default request for a second branch.

In an example embodiment, the user can specify a schedule for conducting transactions. For example, the user can specify the times of week when the user intends to withdraw money from the bank (or the user can specify periods of time during which the user intends to conduct the transactions). The user can also specify an optional location for the withdrawals. Each time the user enters the specified location at one of the specified times, the server messages the ATM most suited for processing the user's request, and in response, the ATM processes the user's request. The ATM can also make a sound or visual cue to direct the user to the ATM machine.

In an example embodiment, a kiosk can be provided at an ATM location and the kiosk can receive the user's request. Based on the user's request, the kiosk (or the server) can determine which ATM the user should visit. For example, the user can enter the user's username, password or even scan the user's smart card. The user can also specify the request at the kiosk, e.g., a withdrawal of $60 including only $20 notes. After receiving this request, the kiosk can transmit the request to the server, and the server can determine which ATM to use. The server can send a message to the user's device and the chosen ATM to guide the user for approaching the ATM. Alternatively, the kiosk can poll all the ATMs at the location and determine which ATM to refer the user to. The kiosk can message both the user and the ATM.

Designating the Appropriate ATM

In an example embodiment, based on the user's request, the server can determine which ATM is most suitable to process the user's request. This determination can be based on a variety of factors. For example, the determination can be based on the types of notes available at the ATMs at the specified location. As another example, the determination can be based on the ATM's features and capabilities. As yet another example embodiment, the determination can be based on a strategy to maximize the utilization of all ATMs within an area. As yet another example, it can be based on a strategy to minimize the wait time for customers at the specified location. As yet another example, it can be based on a strategy to prioritize certain customer over other customers.

In one embodiment, a user's request can specify a sum of money to be withdrawn and a denomination for the notes. The server can choose an ATM which includes the requested notes. The server can transmit signals to the user's device and the chosen ATM.

In another embodiment, a server can receive requests from a plurality of users to conduct transactions at the same location. The users can submit these requests within a short period of time. The server can assign an order of priority to the requests and assign the requests to ATM machines based on each user's order of priority. The server can transmit the requests to the ATMs available at the location based on the priority order.

In an example embodiment, the server determines a user's priority order based on the user's account status, e.g., users with elite account status receive service prior to other users. In another example embodiment, a user's type of request determines the user's order of priority. For example, the server processes the simpler requests or the requests that can be processed quicker before it processes other requests, e.g., check deposits can be processed before withdrawal requests because check deposits can occur faster than withdrawals. In yet another example embodiment, the server can prioritize scheduled requests. For example, a server received two requests for a location for a specific time. One request is received two weeks in advance of the transaction and the other request is received moments before the transaction. The server can prioritize the request that was scheduled in advance of the transaction.

In an example embodiment, the server can determine which ATM is best suited to serve a user based on the information included in the user's request. For example, if the user is asking for $20 bills in Midtown, Manhattan, the server can point the user to an ATM that can process this requests. In another example embodiment, the server can make the determination based on other information. For example, the user's request can specify that the user intends to withdraw money from the user's account. The user does not specify which ATM location the user desires to withdraw money from. However, after entering a branch of the bank, the server can receive a signal from the user's cellphone (or the branch) indicating that the user is in the branch. Using this information, the server can determine which ATM at the branch is best suited to process the user's request.

In an example embodiment, the server can determine which ATM to assign to the user's request based on information received from a device located at or nearby the ATMs. For example, at an ATM location, a bank can install a camera. The camera can take photos of the user as the user enters the location. The camera can transmit the photos to a module on a processing system and the module can analyze the photos. Based on the analysis, the module can determine that the user is sitting on a wheelchair. The module can transmit this information to the server. Once the server receives this information, the server can assign a wheelchair accessible ATM to the user. In one embodiment, the processing system is located where the ATMs are located, but in another embodiment, the processing system is located elsewhere, e.g., at the server.

In one embodiment, the server can assign requests to ATMs based on a strategy to maximize the utilization of all ATMs within an area. For example, an ATM cluster can include a plurality of ATMs in a row. If the banknotes in one of the ATMs is being withdrawn faster than other ATMs in the row, the server can assign new requests to the other ATMs in the row. This strategy can maximize the number of operational ATM in the location.

In one example embodiment, the server can assign requests based on a strategy to minimize the wait time for users at a specified location. For example, the server can estimate a wait time for each user waiting for service at ATMs of an ATM cluster. The server can assign the requests to ATMs to minimize the wait time for some or all the user. In one embodiment, the minimization of the wait time for users with elite status is prioritized over users without the elite status.

In an example embodiment, when multiple requests are pending at a location, the server can send a message to the user to minimize the user's wait time at the location. For example, a server can receive a plurality of requests for a specific location. The server can designate a rank to each user (or request) and command the ATM to process the requests based on the ranking. Based on the ranking of each user, the server can estimate a wait time for the user. The server can also receive GPS information for each user and can calculate a commute time for the user to the location. Based on the commute time as well as the wait time for a given user, the server can message the user when to leave the user's current location to have the minimum wait time at the ATM location.

In one specific embodiment, an ATM location can include a camera which can take a photo of the users waiting at the location. The camera can transmit the photo to an object recognition (and/or facial recognition) module. The module can recognize an individual with disability, e.g., by detecting a wheelchair. The module can transmit the request to the server and the server can prioritize the disabled person's request. In another specific embodiment, the server can prioritize requests received from elderly.

In one embodiment, prior to determining which ATM to assign to the request, the server can poll the ATMs available to be assigned to the request. For example, the server can poll the ATMs located at the requested location to determine which ones can be ready to address the customer's needs, e.g., which ones have $20 bills. The server can assign requests to ATMs based on the ATMs' responses to the server's poll request.

Location-Based Signal

In an example embodiment, the server can receive location-based information, and using the location-based information, the server can notify the user's device and an ATM. The notification can inform the user which ATM to approach and the notification can inform the ATM that the user is approaching the ATM.

In an example embodiment, the user's device can be a smart device or a cellphone and the device can include GPS capabilities. The device can also include an application which can monitor the GPS coordinates of the device. In one embodiment, the device can notify the server if the application determines that the device is at or near a location associated with an ATM. Upon receiving this information, the server can transmit a signal to the device and the ATM. The signal can trigger a display of a visual cue or emission of a sound cue in the device, ATM or both. In another embodiment, the device can continuously, periodically or intermittently transmit the location information for the device to the server, and if the server determines that the location of the device is at or close to an ATM location, the server can transmit the signal to the device and the ATM. The signal can trigger a visual or sound cue in the device, ATM or both.

In an example embodiment, the user's device can be a smart device or a cellphone and the device can include wireless capabilities such as radio, Bluetooth, Wi-Fi, cellular, etc. An ATM location can include one or more transmitters (or beacons), which can transmit wireless signals to the user's device. Using the signals, the user's device can determine that the device is located in or close to an ATM location (or the device can determine its location relative to the beacons), and the user's device can transmit this information to the server. Alternatively, the transmitters at the ATM location can receive a signal from the user's device, and using this signal, the transmitters (or a communication device connected to the transmitters) can notify the server that the user's device is within or close to the ATM location.

In another example embodiment, the determination that the user's device is at or near an ATM location can be facilitated by a Wi-Fi signal received by the user's device. Many Wi-Fi networks can transmit a specific service set identifier ("SSID") (or another identifier, which can be a unique identifier). When a device enters an ATM location, the device can discover the SSID of the Wi-Fi network that is broadcasted throughout the location. The device can transmit the SSID of the network to the server. The server can include a database storing the location names or identifiers associated with SSIDs. In some embodiments, each SSID can be unique such that it is associated with only one location. Therefore, matching an SSID with an entry on the database uniquely identifies the name or identifier of the location.

In other embodiments, the SSIDs are not unique. In these embodiments, in addition to SSIDs and location names (or identifiers), the database can include GPS coordinates associated with each location name (or identifier) and SSID. The device can transmit an SSID and the user's coordinates to the server. Using the user's coordinates, the server can narrow the number of SSIDs available and then match the received SSID with the name (or identifier) of a location included on the narrowed list. Using this method, there is a high likelihood that only one name (or identifier) of location can be found for the SSID received by the server.

In another example embodiment, the determination that the user's device is at or near an ATM location can be facilitated by the music played at the location. In these embodiments, each location can play a predetermined playlist and the database can include this playlist for each location. The user's device can record a portion of the music track played at the location. In one embodiment, the user's device can identify the music track, for example, by name, and transmit to the sever the name of the music track and the time when the device made the recording. In another embodiment, the user's device can transmit to the server the recorded portion of the music track and the time when the device made the recording. The sever can look up all the music tracks played at the recording time, and by comparing the name of the recorded track to the names stored on the database, the server can identify the name of the location.

In an example embodiment, the determination that the user's device is at or near an ATM location can be facilitated by detection of an inaudible sonic signal emitted inside the location. For example, the inaudible sonic signal can encode a numeric identifier or a location identifier and this information can be received by the user's device. A microphone or speaker of the device can detect the inaudible sonic signal. This detection can occur, e.g., once the device receives a signal that the device has entered an indoor location. Alternatively, the device can listen for inaudible sonic signals all the time, or periodically. As yet another example, the device can listen for inaudible sonic signal when a user activates a listening mode on an application of the device. In response to detection of the inaudible sonic signal, a processor of the device can determine the store identifier, the user's device can transmit the store identifier to the server, and the server can ascertain the identity of the location based on the location identifier provided by the user's device.

In some embodiments, the location transmitter can broadcast a variable sonic signal which has a variable numeric identifier. The numeric identifier can change based on the time of day or week the user visits the location. Variable numeric identifiers can be beneficial, for example, to signal a message to the server. As another example, a variable numeric identifier can prevent (unauthorized) users from conducting transactions without actually visiting the store. Because the numeric identifier changes over time, unless the user visits the location, the user would not be able to communicate to the server the correct numeric identifier, and hence the user would be prevented from conducting transactions.

In an example embodiment, the determination that the user's device is at or near an ATM location can be facilitated by a unique identification code of the user's device. For example, when a user walks into the ATM location, the user's device can transmit a request for connection to an access point. The access point can be a Wi-Fi, Bluetooth or cellular access point. A transmitter of the device can transmit the request using a Wi-Fi, Bluetooth or cellular communication.

In some embodiments, the request can include the unique identification code of the user's device. In other embodiments, upon connection to the access point, the user's device transmits the unique identification code to the access point of the ATM location. Once the access point receives the unique identification code, it relays it to the server. In addition, the access point can transmit to the server an identifier for the location at which the access point is located. Using the user's unique identification code and the location identifier, the server can identify the user and the ATM location. Specifically, the server can include a database which has the unique identification code for all of its users and all of the location identifiers for the ATM locations. The server can look up the user's unique identification code and the location identifier to identify the user and the ATM location.

In an example embodiment, the determination that the user's device is at or near an ATM location can be facilitated by a facial recognition technique. For example, the server can include a database, and for each accountholder, the database can include one or more photos of the face of the accountholder. The ATM location can include a camera. When an accountholder enters an ATM location, the camera can a photo of the accountholder. A processing system at the ATM location can transmit the photo to the server. Using a facial recognition module or application, the server can determine the identity of the user who entered the ATM location. The processing system can also transmit a location identification number to the server, which can assist the server in determining the location of the user. In one embodiment, the processing system can be located at the ATM location, but in another embodiment, the processing system can be located elsewhere, e.g., at the server.

Sound and Visual Signals

In an example embodiment, a server can transmit a communication to the a user's device and to an ATM. The communication can inform the user which ATM is assigned to complete the user's requested transaction. The communication can also inform the ATM that the user is approaching the ATM. In an example embodiment, after the device and the ATM receive the communication, the device, the ATM or both emit a sound. In one embodiment, the sound can be emitted according to a pattern.

In one embodiment, the sounds emitted from the device and the ATM are complementary sounds. For example, the device (or the ATM) can emit a sound and the ATM (or the device) can emit a corresponding sound., e.g., ding-dong, chopstick sounds, Marco-Polo sounds. In one embodiment, the sounds can play a rhythm, song, music, etc. In one embodiment, there can be a pitch or there can be a repetition in pattern. One pattern can relate to the volume and another pattern can relate to the amplitude of the sound. One pattern can be that the sound starts on the device (or the ATM) and continues on the ATM (or the device). This can provide a feedback mechanism.

In one embodiment, the device starts emitting a sound, and in response to receiving the sound, the ATM responds a corresponding sound, e.g., the device and the ATM can speak to one another. In another embodiment, the ATM starts emitting a sound, and in response to receiving the sound, the device responds a corresponding sound. In one embodiment, the initial sound emitted by the device or the ATM is inaudible.

In one embodiment, as the device approaches the designated ATM, the device, the ATM or both can emit a particular sound pattern. For example, the patterns can be that the sounds can get tighter or the sounds can reach a logical conclusion. As another example, the patterns can be that the sounds speed up, or one gets warmer and another one gets cooler. In one embodiment, the sounds get correspondingly louder.

In one embodiment, in addition to or instead of a sound cue or signal, there can be a visual cue on the user's device, the ATM or both. For example, the device, the ATM or both can flash for a period of time. In one embodiment, the device, the ATM or both can display an image or a video clip. In one embodiment, the device can display a photo of the ATM and the ATM can show a photo of the user. In one embodiment, the device, the ATM or both can display a predetermined photo, media file or text.

In an example embodiment, the device, the ATM or both continue to emit a sound until a trigger event occurs. For example, the trigger event can occur after a predetermined period of time passes. As another example, the trigger event can occur once the device approaches a predetermined distance of the ATM. As another example, the trigger event can occur when a camera of the ATM takes a photo of the user and confirms the identity of the user. This confirmation can take place using a facial configuration technology. As another example, the trigger event can occur when the user enters a pin code on the ATM or the device. The pin code can be a preset pin code or it can be a pin code that was displayed on the ATM or the device. As another example, the trigger event can occur when the ATM receives an attenuated signal (discussed below).

In an example embodiment, the ATM can complete the transaction after a confirmation event occurs. For example, the confirmation event can be an attenuated signal confirmation. As another example, the confirmation event can be the same as the trigger event. As another example, the confirmation event can be a different event as the trigger event.

Attenuated Signal Confirmation

In one example embodiment, the ATM or the device can stop emitting the sound once the user's device is brought close to the ATM, i.e., the device provides an attenuated signal confirmation. In another example embodiment, the ATM can complete the transaction only after the device provides an attenuated signal to the ATM. The attenuated signal can ensure a physical proximity between the device (i.e., user) and the ATM. This can provide another layer of protection for the transaction.

In one example embodiment, the ATM machine transmits an attenuated signal, e.g., NFC. The device is configured to receive the attenuated signal and send a response to the ATM. In another example embodiment, the device is configured to transmit an attenuated signal to the ATM and the ATM can confirm the user once it receives the signal. In yet another example embodiment, each of the ATM and the device can transmit a signal, and once the other device receives the signal, each one transmits the signal to the server. If the signals match, the server sends a corresponding signal to each device to confirm the other device.

In one embodiment, the attenuated signal can be exchanged between the ATM and the device only when the device and the ATM are close to each other, e.g., only several inches apart. For example, the user can hold the phone against a target area of the ATM. The attenuated signal can be an NFC signal or a Bluetooth signal.

In an example embodiment, when the device and the ATM are held close to each other, they are in sync. Being in sync means that data is being exchanged between the device and the ATM wirelessly. It can be a broadcast by a first device, receiving the broadcast by a second device, and returning a message to the first device indicating that the broadcast was received.

Non-ATM Applications

Embodiments of this disclosure describe various features and functionalities for ATMs. However, ATMs are only one device in the family of financial machines and these descriptions are not limited to ATMs. In fact, these features can be implemented in other devices which have similar components to ATMs, e.g., kiosks or ticket machines.

The user's device can be any device including cellphones, smart phones, smart devices, tablets, wearable devices, laptops, etc.

Technical Implementation of a Processing Unit or a Server

Figure 3:
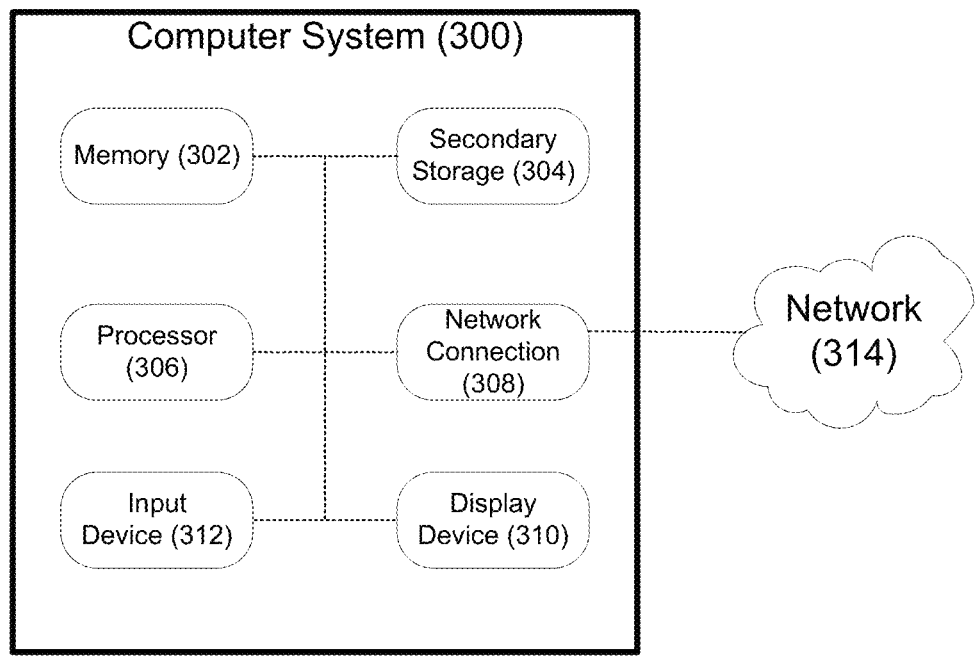
FIG. 3 illustrates exemplary hardware components for a processing unit.

FIG. 3 illustrates exemplary hardware components of a server or processing unit. A computer system 300, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 300, may run an application (or software) and perform the steps and functionalities described above. Computer system 300 may connect to a network 314, e.g., Internet, or other network, to receive inquires, obtain data, and transmit information and incentives as described above.

The computer system 300 typically includes a memory 302, a secondary storage device 304, and a processor 306. The computer system 300 may also include a plurality of processors 306 and be configured as a plurality of, e.g., bladed servers, or other known server configurations. The computer system 300 may also include a network connection device 308, a display device 310, and an input device 312.

The memory 302 may include RAM or similar types of memory, and it may store one or more applications for execution by processor 306. Secondary storage device 304 may include a hard disk drive, floppy disk drive, CD-ROM drive, or other types of non-volatile data storage. Processor 306 executes the application(s), such as those described herein, which are stored in memory 302 or secondary storage 304, or received from the Internet or other network 314. The processing by processor 306 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 300 may store one or more database structures in the secondary storage 304, for example, for storing and maintaining the information necessary to perform the above-described functions. Alternatively, such information may be in storage devices separate from these components.

Also, as noted, processor 306 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 300.

The input device 312 may include any device for entering information into the computer system 300, such as a touch-screen, keyboard, mouse, cursor-control device, microphone, digital camera, video recorder or camcorder. The input and output device 312 may be used to enter information into GUIs during performance of the methods described above. The display device 310 may include any type of device for presenting visual information such as, for example, a computer monitor or flat-screen display (or mobile device screen). The display device 310 may display the GUIs and/or output from sub-system components (or software).

Examples of the computer system 300 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 300 is shown in detail, system 300 may use multiple computer systems or servers as necessary or desired to support the users and may also use back-up or redundant servers to prevent network downtime in the event of a failure of a particular server. In addition, although computer system 300 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 300, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
receiving, at an automated teller machine ("ATM"), a poll request from a server based on a user request submitted through a user device, the poll request inquiring about availability of a sum of money and at least one denomination of a currency;
transmitting, from the ATM to the server, a response including an indication of availability of the sum of money and the at least one denomination of the currency;
receiving, at the ATM, from the server a communication informing the ATM that a user having the user device is approaching the ATM;
emitting, at the ATM, a sound corresponding to a sound emitted from the user device;
receiving, at the ATM, from the user device an attenuated NFC signal confirmation indicating the user device is brought close to the ATM;
stopping emitting, at the ATM, the sound; and
distributing, at the ATM, the sum of money using the at least one denomination of the currency.

2. The method of claim 1, wherein the first sound emitted at the ATM is complementary to the sound emitted from the user device.

3. The method of claim 1, wherein the sound emitted at the ATM and the sound emitted from the user device are emitted according to a pattern.

4. The method of claim 3, wherein the pattern is that the second emitted at the ATM is a sound that continues the sound emitted from the user device.

5. The method of claim 3, wherein the pattern is that the sound emitted at the ATM and the sound emitted from the user device gets tighter.

6. The method of claim 3, wherein the pattern is that the sound emitted at the ATM and the sound emitted from the user device correspondingly increase in volume.

7. The method of claim 1, the sound emitted from the user device is inaudible.

8. The method of claim 3, wherein the pattern is that the sound emitted at the ATM and the sound emitted from the user device speed up.

9. The method of claim 3, wherein the pattern is that the sound emitted at the ATM and the sound emitted from the user device relate to a sound amplitude.

* * * * *